(12) United States Patent
Newstead et al.

(10) Patent No.: US 11,590,877 B2
(45) Date of Patent: Feb. 28, 2023

(54) LOADING ARM ARRANGEMENT FOR A SWAP BODY VEHICLE FOR LOADING TRANSPORT CONTAINERS WITH A HOOK

(71) Applicant: THE DYNAMIC ENGINEERING SOLUTION PTY LTD, Holden Hill (AU)

(72) Inventors: Michael Newstead, Gawler (AU); James Browne, Woodville South (AU); Oscar Fiorinotto, Semaphore Park (AU)

(73) Assignee: THE DYNAMIC ENGINEERING SOLUTION PTY LTD, Holden Hill (AU)

( * ) Notice: Subject to any disclaimer, the term of this patent is extended or adjusted under 35 U.S.C. 154(b) by 0 days.

(21) Appl. No.: 17/295,413

(22) PCT Filed: Jun. 5, 2019

(86) PCT No.: PCT/EP2019/064641
§ 371 (c)(1),
(2) Date: May 19, 2021

(87) PCT Pub. No.: WO2020/104077
PCT Pub. Date: May 28, 2020

(65) Prior Publication Data
US 2021/0394661 A1    Dec. 23, 2021

(30) Foreign Application Priority Data
Nov. 20, 2018   (DE) .................... 10 2018 129 146.9

(51) Int. Cl.
*B60P 1/64*   (2006.01)
*B60P 1/48*   (2006.01)

(52) U.S. Cl.
CPC ............. *B60P 1/6463* (2013.01); *B60P 1/483* (2013.01); *B60P 1/6427* (2013.01)

(58) Field of Classification Search
CPC ........ B60P 1/483; B60P 1/6427; B60P 1/6463
See application file for complete search history.

(56) References Cited

U.S. PATENT DOCUMENTS

| 5,102,284 | A | 4/1992 | Raisio | |
| 6,705,823 | B2* | 3/2004 | Bohata | B60P 1/6463 414/491 |
| 7,726,930 | B2* | 6/2010 | Simpson | B60P 1/6463 414/491 |

FOREIGN PATENT DOCUMENTS

| CA | 1 210 365 A | 8/1986 |
| DE | 000002460803 A1 | 9/1976 |

(Continued)

OTHER PUBLICATIONS

German Search Report dated Jun. 19, 2019 as received in application No. 10 2018 129 146.9.

*Primary Examiner* — James Keenan
(74) *Attorney, Agent, or Firm* — Maschoff Brennan

(57) ABSTRACT

The invention relates to a loading arm assembly for a load-handling vehicle, having a main arm, having an auxiliary arm, and having a gripping hook, wherein the loading arm assembly is configured for unloading and loading transportation containers having a hook, wherein a pivot arm part is disposed on the auxiliary arm so as to be pivotable by way of an articulation, wherein a gripping hook is disposed so as to be pivotable on the pivot arm part. The loading arm assembly is improved in that the pivot arm part in a transporting position engages in a clearance of the auxiliary arm.

9 Claims, 6 Drawing Sheets

(56) References Cited

FOREIGN PATENT DOCUMENTS

Figure 1:
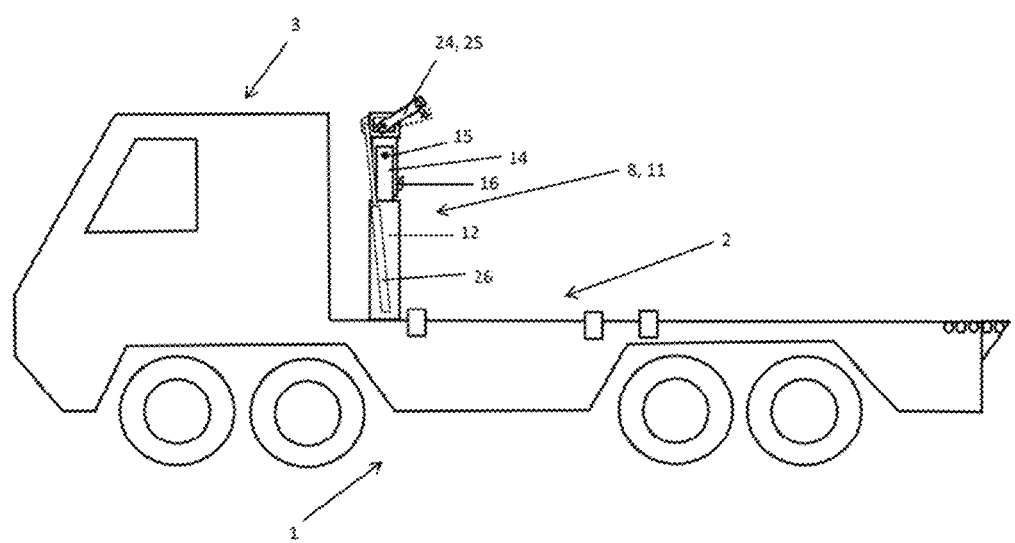

| | | | |
|---|---|---|---|
| DE | 690 07 498 T2 | 10/1994 | |
| EP | 0 107 326 A1 | 5/1984 | |
| EP | 0 107 892 A1 | 5/1984 | |
| EP | 0107892A-1 * | 5/1984 | ............. B60P 1/483 |
| EP | 0 634 304 A1 | 1/1995 | |
| EP | 1155905 A1 * | 11/2001 | ............ B60P 1/6463 |
| FR | 2 613 341 A1 | 10/1988 | |
| GB | 2 085 845 A | 5/1982 | |
| GB | 2 298 856 A | 9/1996 | |

* cited by examiner

LOADING ARM ARRANGEMENT FOR A SWAP BODY VEHICLE FOR LOADING TRANSPORT CONTAINERS WITH A HOOK

The invention relates to a loading arm assembly for a load-handling vehicle.

Load-handling vehicles are trucks which are conceived as carrier vehicles for transporting special containers. Such load-handling vehicles are also referred to as roll-on/roll-off dump trucks or hook-lift roll-on/roll-off trucks. Various roll-on/roll-off containers which can be received by a load-handling vehicle having a loading arm assembly exist.

There are roll-on/roll-off containers which have a hook that points obliquely upwards. In order for such transportation containers, such as roll-on/roll-off flatbeds, for example, to be loaded onto the load-handling vehicle, the loading arm assembly has a corresponding gripping hook by way of which the hook of the transportation container can be gripped so as to thus pull the transportation container onto the load-handling vehicle.

A load-handling vehicle having a loading assembly is in each case known from EP 0 107 326 A1 and EP 0 107 892 A1. The loading assembly has a main arm, wherein the main arm is disposed so as to be pivotable on the vehicle chassis. An auxiliary arm is disposed on the main arm. A pivot arm part is disposed on the free end of the auxiliary arm. The pivot arm part by way of one end thereof is connected in an articulated manner to the auxiliary arm, and by way of the other end thereof is connected in an articulated manner to the gripping hook. A piston/cylinder unit herein connects the auxiliary arm to the pivot arm part, wherein the piston/cylinder unit engages eccentrically on the pivot arm part. Furthermore, a further piston/cylinder unit engages eccentrically on the pivot arm part, said further piston/cylinder unit extending between the pivot arm part and the gripping hook. The auxiliary arm in the transporting position protrudes so as to be substantially vertical, the pivot arm part extending so as to be horizontal to the truck bed of the vehicle, and the gripping hook, when viewed in the longitudinal direction of the load-handling vehicle, hangs behind the auxiliary arm. On account thereof, additional installation space is required in the longitudinal direction of the load-handling vehicle.

Furthermore, there are loading arm assemblies which can receive a so-called ISO container. ISO standard 668 forms the respective standard for said ISO containers. Said ISO containers do not have a respective hook but are gripped by the corners. To this end, a correspondingly configured loading arm assembly has at least two corner grippers, wherein the corner grippers can grip the ISO container at the corners.

In order to now be able to load roll-on/roll-off containers of both types, that is to say having a hook and roll-on/roll-off containers in the form of ISO containers, using one load-handling vehicle, adapter solutions are known in the prior art.

A load-handling vehicle having a loading arm assembly is known from GB 2 298 856 A. The loading arm assembly has a main arm, wherein the main arm is disposed so as to be pivotable on the vehicle chassis. In turn, an auxiliary arm, configured so as to be elbow-shaped, in the form of an articulated arm is disposed on the main arm by way of an articulated joint. A gripping hook is configured on the free end of the articulated arm. An adapter having four corner grippers can now be attached to the elbow-shaped region of the articulated arm, so as to thus be able to also load and unload ISO containers. The adapter when not in use can be unloaded onto the load-handling vehicle behind the cab.

This design embodiment has the disadvantage that the adapter has to be attached to or released from the articulated arm again each time, should dissimilar roll-on/roll-off containers have to be loaded.

It has furthermore been demonstrated that gripping ISO containers is not always possible by way of four corner grippers. For example, such load-handling vehicles are also used for defence applications, wherein ISO containers or the transportation containers having hooks do not always stand on a flat solid ground but on rough terrain. There is the problem herein that the ISO containers can sink into soft ground and the lower corners of the ISO container if at all can thus only be reached with difficulty.

In such uses there is furthermore the problem that the operator of the load-handling vehicle can be exposed to danger when he/she gets out of the vehicle. It is therefore not always possible for an adapter to be used.

A load-handling vehicle having a loading arm assembly for loading ISO containers is known from EP 0 634 304 A1. The loading arm assembly herein is configured as a thrust hook. The loading arm assembly has a main arm that is pivotably fixed to the vehicle chassis, wherein an auxiliary arm, configured so as to be elbow-shaped, in the form of a thrust hook arm is disposed so as to be telescopic on the main arm. The main arm is telescopic. The thrust arm is configured so as to be orthogonal to the main arm on the free end of the latter, wherein the thrust arm is likewise configured as a telescopic arm. A crossbeam is disposed on the end of the thrust arm, wherein the corner grippers are disposed on the end of the crossbeam. The corner grippers in turn herein are disposed so as to be telescopic on the crossbeam. In order for the ISO container to now be loaded, the load-handling vehicle is first positioned, ideally so as to be aligned with the container. Thereafter, the position of the corner grippers relative to the upper corners of the container can be positioned by pivoting and telescoping the main arm, by telescoping the thrust arm, and by telescoping the crossbeam having the grippers. It is now no longer necessary for the lower corners but only for the upper corners of the ISO container to be gripped, the latter being more readily accessible. It has been demonstrated that even this design embodiment is not yet configured in an optimal manner. The loading of the ISO container is still possible only with difficulty when the ISO container stands on soft ground and partially sinks thereinto, wherein for example the container stands so as to be tilted about its longitudinal axis in relation to the load-handling vehicle, or the load-handling vehicle cannot be positioned so as to be exactly aligned with the container.

The invention is therefore based on the object of improving the generic loading arm assembly and a respective load-handling vehicle having such a loading arm assembly.

Said object on which the invention is based is now achieved by a loading arm assembly. According to the invention, the pivot arm in a transporting position engages in a clearance of the auxiliary arm. This has the advantage that, when viewed in the longitudinal direction of the load-handling vehicle, only a minimal installation space is required in the transporting position. The installation space in the longitudinal direction of the load-handling vehicle is optimized. The main arm in the transporting position extends substantially in the longitudinal direction of the load-handling vehicle, and the auxiliary arm protrudes upwards. Since the auxiliary arm has a clearance into which the pivot arm can be pivoted, this has the advantage that the axial region of the auxiliary arm can be utilized for the auxiliary arm as well as for the pivot arm part. The pivot arm part in the transporting position extends so as to protrude upwards, and in the longitudinal direction of the load-handling vehicle overlaps the auxiliary arm by more than 60%, in particular by more than 80%. It is conceivable for the gripping hook to engage at least in part in the clearance, and optionally in the axial direction of the load-handling vehicle to in part protrude beyond the clearance. Said loading arm assembly is particularly suitable for comparatively short transportation vehicles such as 20 ft containers and corresponding roll-on/roll-off containers.

The auxiliary arm preferably has two legs, wherein the legs delimit the clearance, wherein the pivot arm part is disposed so as to be articulated on the legs, and in the transporting position can extend between the legs. A space-saving construction which in mechanical terms is capable of bearing loads is achieved on account thereof. The two legs can have an axle on which the pivot arm part is disposed.

The gripping hook by means of a further articulation is preferably disposed so as to be rotatable on the pivot arm part. This enables the hook of the transportation container to be reliably gripped. A piston/cylinder unit which is preferably activatable in a hydraulic or pneumatic manner preferably engages on the gripping hook and on the pivot arm part.

In order for an optimal positioning capability of the corner grippers and/or of the gripping hook to be achieved, the main arm is configured so as to be telescopic, and the auxiliary arm is preferably likewise configured so as to be telescopic, wherein the auxiliary arm has a first telescopic arm part that is disposed at a fixed angle on the main arm, and has a second telescopic arm part, wherein the second telescopic arm part is capable of being telescopically moved relative to the first telescopic arm part, wherein the pivot arm part is disposed so as to be articulated on the second telescopic arm part. The second telescopic arm part has the two legs. This enables the gripper system, or the gripping hook, respectively, to be able to be moved in a large range in order for the transportation containers to be gripped.

A piston/cylinder unit which for pivoting the pivot arm part relative to the axillary arm is preferably activatable in a hydraulic or pneumatic manner preferably engages on the second telescopic arm part and on the pivot arm part.

The gripping hook is disposed on one end of the pivot arm part. This has the advantage that a gripper system for gripping ISO containers can be disposed on the other end of the pivot arm part, wherein the articulation connecting the auxiliary arm and the pivot arm part is disposed between the ISO container gripper system and the gripping hook articulation.

The articulation connecting the auxiliary arm and the pivot arm part is situated so as to be substantially centric between the first and the second end of the pivot arm part. The articulation connecting the auxiliary arm and the pivot arm part is preferably situated in the range of 40% to 60% of the longitudinal extent of the pivot arm part. This has the advantage that the ISO container gripper system as well as the gripping hook are movable to a maximum by pivoting the pivot arm.

In a preferred design embodiment, a crossbeam having at least two corner grippers is disposed on the pivot arm part, in particular on one end of the pivot arm part. This has the advantage that the loading arm assembly is suitable for unloading and loading ISO containers. The articulation by which the pivot arm part is connected to the auxiliary arm is preferably disposed so as to be centric between the first to the second end of the pivot arm. The crossbeam herein is disposed on the one end of the pivot arm, and the gripping hook is disposed on the other end of the pivot arm.

Accordingly, the loading arm assembly for a load-handling vehicle having a main arm and having an auxiliary arm is designed in such a manner that the loading arm assembly is configured for unloading and loading ISO containers and for unloading and loading transportation containers having a hook. This design embodiment has the advantage that an adapter can be dispensed with. Transportation containers having a hook, as well as ISO containers, can be unloaded from the load-handling vehicle or loaded onto the load-handling vehicle by way of this loading arm assembly.

The crossbeam is pivotable relative to the pivot arm part about two axes. The drive herein can be motorized, pneumatic, or in particular hydraulic. The crossbeam is pivotable about the longitudinal axis of the pivot arm part, firstly. An angular offset between the load-handling vehicle and the roll-on/roll-off container can be equalized on account thereof. When the roll-on/roll-off container stands so as not to be precisely aligned with the load-handling vehicle but is at a slight angular offset, the crossbeam can thus be rotated about the longitudinal axis of the pivot arm part connected to said crossbeam, on account of which the corner grippers can be reliably attached to the upper corners of the ISO container. The pivotability can be, for example, more than 5 degrees, in particular more than 10 degrees.

On account of the more precise position-setting capability of the crossbeam having the two corner grippers, this design embodiment furthermore has the advantage that it is no longer necessary for the operator to leave the vehicle cab. This has advantages in particular in the case of defence applications, since the operator is protected on account thereof. The load-handling vehicle is in particular configured as a defence vehicle. It is conceivable for the cab to have an armoured protection.

The crossbeam and the pivot arm part connected thereto are mutually disposed in a T-shaped manner. An articulation between the crossbeam and the pivot arm part is in particular configured as a universal joint. The universal joint has a crosspiece, wherein the crosspiece has two axle stump pairs that cross in an orthogonal manner. The one axle stump pair in the basic position herein points substantially in the longitudinal direction of the auxiliary arm. The crossbeam is disposed on said axle stump pair so as to be rotatable about the longitudinal axis of the pivot arm part. The other axle stump pair in the basic position is disposed so as to be perpendicular to the connected pivot arm part and the crossbeam and thus enables the movement about the transverse axis. One axle stump pair is disposed so as to be rotatable on the pivot arm part, and the other axle stump pair is disposed so as to be rotatable on the crossbeam.

A housing is disposed on the end of the free auxiliary arm, wherein the axle stump pair that extends along the transverse axis is preferably disposed, in particular mounted, so as to be rotatable in two receptacles of the housing. The crossbeam herein engages through the housing. The housing on the upper side thereof has an assembly opening, and on the front side and the rear side in each case likewise one assembly opening, wherein said two assembly openings serve as receptacles for the axle stump pair that is oriented in the transverse direction. Bearing shells can be inserted in the assembly openings, wherein heads of the assigned axle stump pair are rotatably disposed in the bearing shells.

The crosspiece is configured so as to be capable of being taken apart for assembly purposes. The crosspiece has the total of four axle stumps and a centre piece to which the axle stumps can be fastened. The centre piece and the axle stumps are in particular interconnectable by a screw connection.

The crossbeam has two crossbeam regions, wherein each of the two crossbeam regions is configured so as to be telescopic. The corner grippers are furthermore pivotable about the longitudinal axis of the crossbeam.

In order for the corner grippers, or the hook, respectively, now to be able to be positioned precisely relative to the roll-on/roll-off container, the load-handling vehicle has in particular a sensor system having at least one preferably optical sensor. The position of the roll-on/roll-off container relative to the load-handling vehicle can be detected by way of said sensor system. A determination of the position of the corners or of the hook, respectively, of the roll-on/roll-off container is in particular possible by means of the sensor system. It is conceivable for the load-handling vehicle to have an automated control system for loading and unloading the roll-on/roll-off containers. To this end, the position of the roll-on/roll-off container, and in particular of the upper corners in the case of an ISO container, or of the hook in the case of a transportation container having a hook, is first determined by means of the sensor system. Proceeding therefrom, the loading arm assembly is actuated in a fully automatic or partially automatic manner such that the corner grippers, or the gripping hook, respectively, can grip the roll-on/roll-off container in a corresponding manner.

A display which displays a camera image or a virtually rendered image of the container and of the loading arm assembly to the operator can be disposed within the cab. It is possible for a pair of VR glasses (virtual reality glasses) to serve as a display. The display facilitates controlling and/or managing the loading procedure for the operator.

Once the roll-on/roll-off container has been pulled onto the load-handling vehicle, the roll-on/roll-off container on the latter is secured automatically by means of a twist-lock system.

The disadvantages mentioned at the outset are therefore avoided, and corresponding advantages are achieved.

There are now a multiplicity of possibilities in terms of design embodiments and refinements of the invention. A preferred design embodiment of the invention will be explained in more detail hereunder by means of the drawing and of the associated description.

Figure 2:
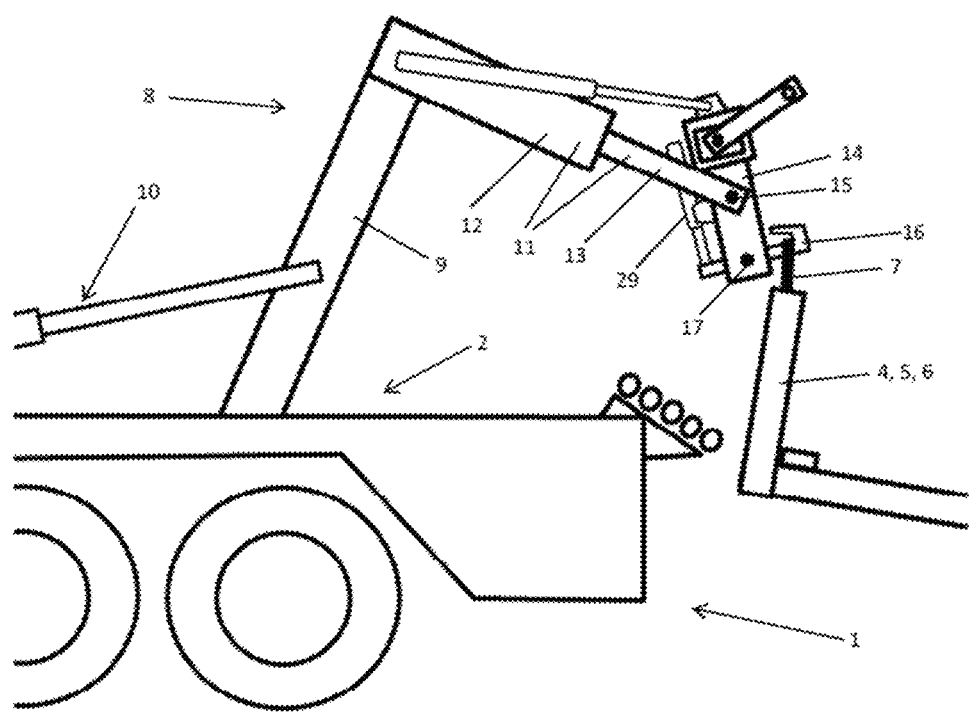
Figure 3:
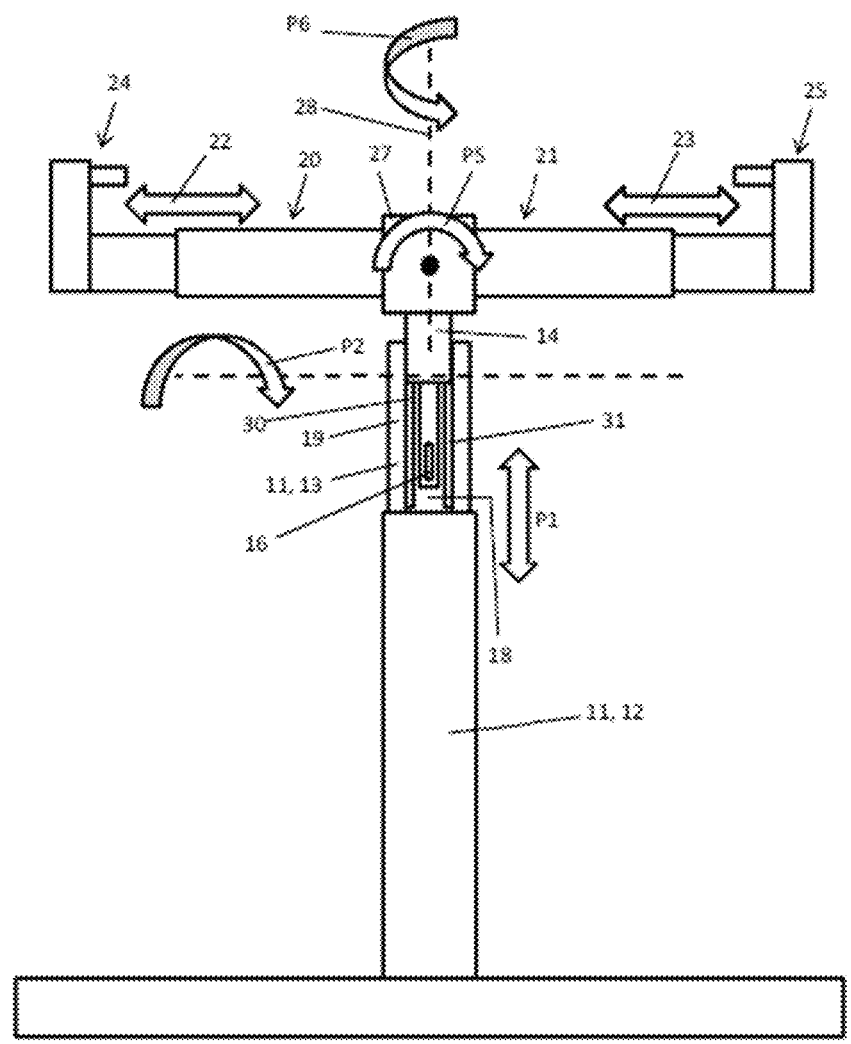
Figure 4:
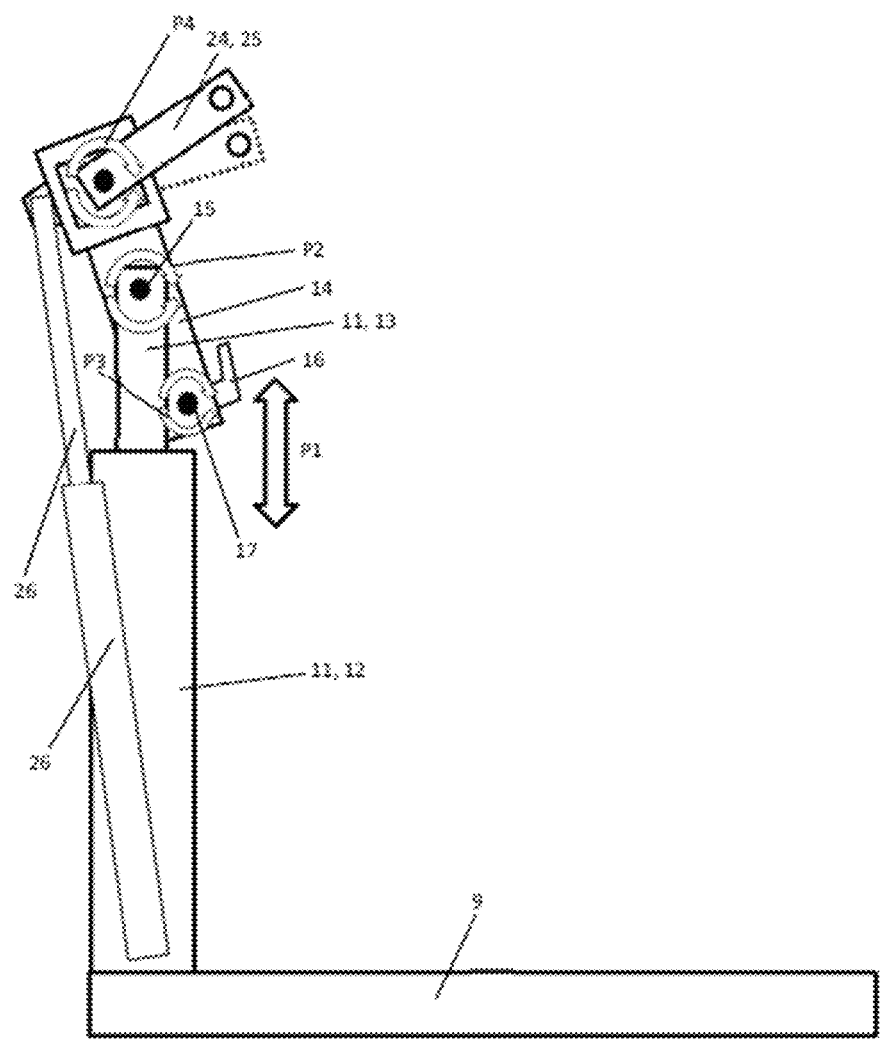
Figure 5:
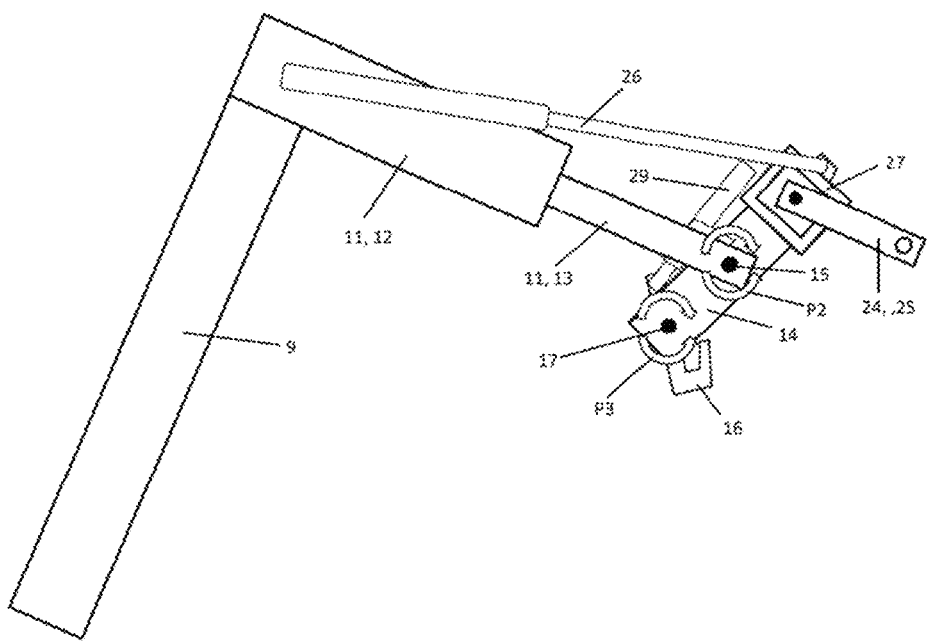
Figure 6:
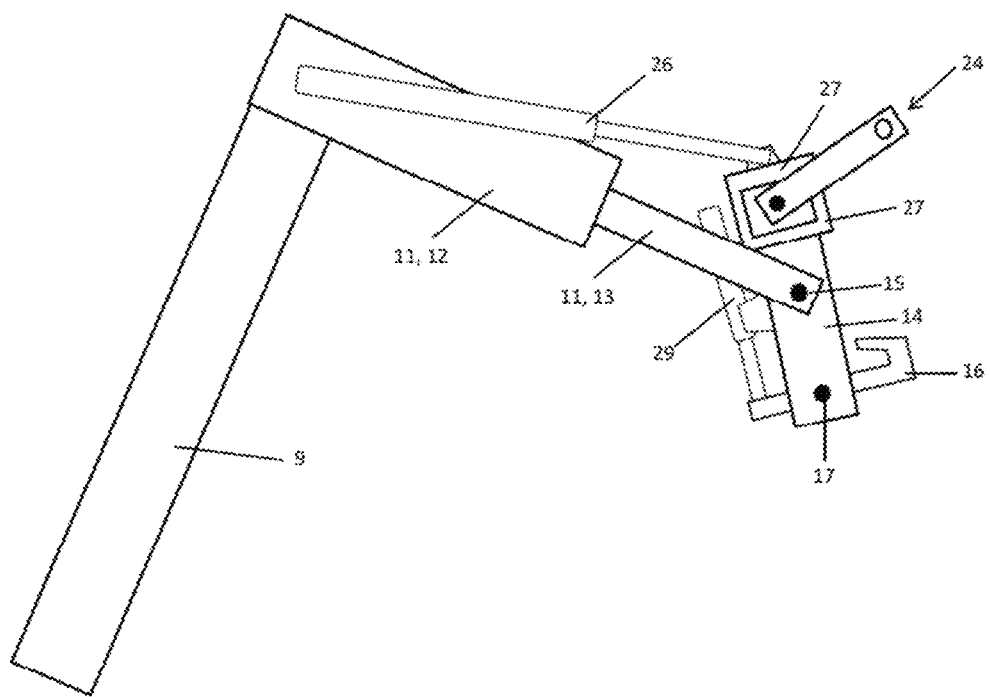

In the drawing:

FIG. 1 in a schematic lateral view shows a load-handling vehicle having a loading arm assembly in a basic position;

FIG. 2 in a schematic lateral view shows part of the load-handling vehicle having the loading arm assembly in a deployed position when loading a roll-on/roll-off container having a hook;

FIG. 3 in a schematic rear view shows the loading arm assembly;

FIG. 4 in a schematic lateral view shows the loading arm assembly, wherein the main arm is disposed so as to be horizontal, and the auxiliary arm is disposed so as to be vertical;

FIG. 5 in a schematic lateral view shows the loading arm assembly, wherein the main arm having the auxiliary arm is disposed so as to be pivoted, and wherein a pivot arm part and a gripping hook are pivoted towards the front; and FIG. 6 in a schematic lateral view shows the loading arm assembly in the position illustrated in FIG. 5, wherein the gripping hook and a pivot arm part are tilted towards the rear.

A load-handling vehicle 1 can be readily seen in FIGS. 1 and 2. The load-handling vehicle 1 has a truck bed 2 and a cab 3. The load-handling vehicle 1 is in particular configured for defence applications. To this end, the cab 3 can be configured so as to be armoured, for example. The load-handling vehicle 1 is in particular suitable not only for on-road use but also for off-road use.

Dissimilar roll-on/roll-off containers 4 such as, for example, an ISO container (not illustrated) or a transportation container 5 having a hook 7, are now preferably capable of being loaded by way of the load-handling vehicle 1. A corresponding roll-on/roll-off flatbed 6 is illustrated as a roll-on/roll-off container 4 here. The load-handling vehicle 1 has a loading arm assembly 8 which is suitable for loading ISO containers as well as transportation containers 5 having a hook 7.

The loading arm assembly 8 has a main arm 9, wherein the main arm 9 by way of the one end thereof is articulated so as to be pivotable on the truck bed 2, in particular on a vehicle chassis or the like. A drive, in particular in the form of a hydraulically activated piston/cylinder unit 10, is present for pivoting the main arm 9. Alternatively, a pneumatic or a motorized drive can be provided. The main arm 9 can in particular be configured so as to be telescopic in the longitudinal direction of said main arm 9 so as to be able to receive roll-on/roll-off containers 4 of dissimilar length. An auxiliary arm 11 is disposed on the other end of the telescopic part of the main arm 9, wherein the auxiliary arm 11 extends so as to be substantially perpendicular to the main arm 9. The auxiliary arm 11 herein is fastened to the main arm 9 at a fixed angle. The auxiliary arm 11 is in particular fastened to a telescopic part of the main arm 9. This design embodiment can also be referred to as a thrust hook. The auxiliary arm 11 can also be referred to as a thrust arm. It is conceivable for the auxiliary arm 11 to be configured as an articulated arm and be disposed so as to be pivotable on the main arm 9 (not illustrated).

The auxiliary arm 11 now preferably has two gripper systems. On the one hand, a gripper system for gripping ISO containers is present, and a gripper system for gripping transportation containers 5 having a hook 7 is present, on the other hand. An adapter can be dispensed with on account thereof.

The auxiliary arm 11 here has two telescopic arm parts 12, 13 which are disposed so as to be mutually displaceable. A pivot arm part 14 is disposed on the end of the second telescopic arm part 13. A pivot arm part 14 is disposed on the auxiliary arm 11, specifically on the telescopic arm part 13, by way of an articulation 15. A gripping hook 16 is pivotably disposed on the pivot arm part 14. The gripping hook 16 is connected to the pivot arm part 14 by way of an articulation 17. The telescopic arm part 13 has a clearance 18, wherein the pivot arm part 14 in a transporting position (cf. FIG. 1) engages in the clearance 18 of the auxiliary arm 11, specifically of the second telescopic arm part 13. This has the advantage that only little installation space is required in the transporting position (cf. FIG. 1). The auxiliary arm 11 and the pivot arm part 14 in the transporting position extend so as to be coaxial, specifically in particular in a cross-sectional plane of the load-handling vehicle 1. On account thereof, roll-on/roll-off containers 4 that are comparatively long in the axial direction of the load-handling vehicle 1 can be loaded. This loading arm assembly 8 is particularly suitable for comparatively short load-handling vehicles 1 for 20 ft containers and corresponding roll-on/roll-off containers 4.

The second telescopic arm part 13 on the free end thereof has two legs 19 which are mutually spaced apart in parallel, wherein the two legs 19 delimit the clearance 18. The two legs 19 encompass the pivot arm part 14 in the region of the articulation 15. A particularly installation-space-saving disposal of the pivot arm part 14 and thus of the gripping hook 16 in the transporting position is enabled on account thereof.

The gripping hook 16 is preferably disposed so as to be pivotable on that end of the pivot arm part 14 that reaches into the clearance 18. The pivot arm part 14 has a main body and two legs 30, 31, wherein the gripping hook 16 is disposed so as to be pivotable on the legs 30, 31. The legs 30, 31 form a first free end of the pivot arm part 14. The pivot arm part 14 on the main body thereof is pivotably connected to the auxiliary arm 11.

The gripping hook 16 has a bar-shaped lever region and a hook region at one end. A piston/cylinder unit 29 engages on the other end that is formed by the lever region. The piston/cylinder unit 29 engages on the lever region of the gripping hook, on the one hand, and on the pivot arm part 14, or on a mounting that is connected to the pivot arm part 14, respectively.

The other gripper system for gripping ISO containers may now be explained in more detail by means of FIGS. 3 and 4.

The telescopic capability of the auxiliary arm 11 is indicated by the arrow P1 in FIG. 3. The crossbeam 20, 21 is disposed on a second, free end of the pivot arm part 14. The crossbeam 20, 21 herein, substantially in the centre thereof, is disposed on the end of the pivot arm part 14. The crossbeam 20, 21 has a first crossbeam region 20 and a second crossbeam region 21 which in FIG. 3 in the longitudinal direction of the crossbeam 20, 21 protrude in each case to the left and the right laterally beyond the pivot arm part 14. Each of the two crossbeam regions 20, 21 is configured so as to be telescopic. The telescopic capability is indicated by the arrows 22, 23. Corner grippers 24, 25 which are in each case pivotable about the longitudinal axis of the crossbeam 20, 21, this being indicated by the arrow P4 (cf. FIG. 4) are disposed on the free ends of the crossbeam regions 20, 21. The respective movements of the crossbeam regions 20, 21, or of the corner grippers 24, 25, respectively, is performed hydraulically, pneumatically, or in a motorized manner. On account of the pivot arm part 14 being pivotable relative to the second telescopic arm part 13, specifically about the articulation 15, the crossbeam 20, 21 can also be pivoted as is indicated by the arrow P2 in FIG. 3. To this end, a piston/cylinder unit 26 is disposed on the auxiliary arm 11, specifically on the first telescopic arm part 12 and on one end of the pivot arm part 14, here specifically on the end having the crossbeam 20, 21.

A particular advantage of the loading arm assembly 8 is that the crossbeam 20, 21 is pivotable relative to the pivot arm part 14 about two axes. This is achieved in that the crossbeam 20, 21 is connected to the pivot arm part 14 by way of a universal joint (not illustrated). In an alternative design embodiment, a ball joint (not illustrated) can be used instead of a universal joint, for example.

A housing 27 is disposed on the end of the pivot arm part 14, wherein the universal joint is disposed within the housing 27. The housing 27 has furthermore in each case two penetration openings so that the crossbeam 20, 21 can engage through the housing 27.

On account thereof, the crossbeam 20 is pivotable about the longitudinal axis 28 of the pivot arm part 14 as well as about a transverse axis (cf. arrows P5 and P6). The transverse axis herein extends transversely to the pivot arm part 14 as well as transversely to the crossbeam 20, 21. The longitudinal axis 28 and the transverse axis are mutually perpendicular.

When the load-handling vehicle 1 and the roll-on/roll-off container 4 in the form of the ISO container stand at an angle to one another and are not mutually aligned, this can be equalized by pivoting the crossbeam 20, 21 about the longitudinal axis 28. When the ISO container stands so as to be tilted about the longitudinal axis thereof, for example because said ISO container has sunk into soft ground, this can be equalized by pivoting the crossbeam 20, 21 about the transverse axis.

On account of this potential pivoting capability of the crossbeam 20, 21 about the longitudinal axis 28 (cf. arrow P6) and the transverse axis (cf. arrow P5), the ISO container can thus be reliably received by the loading arm assembly 8 even in the case of difficult environmental conditions.

The loading arm assembly having a pivoted main arm 9 and auxiliary arm 11 is illustrated in FIGS. 5 and 6. The pivot arm part 14 and the gripping hook 16 in FIG. 5 herein is pivoted towards the front in the direction of the cab 3 (not illustrated). The pivot arm part 14 and the gripping hook is pivoted towards the rear in FIG. 6.

A particular advantage of this loading arm assembly 8 lies in that it is possible for the ISO containers and/or the transportation containers 6 with the corresponding hook 7 to be loaded and unloaded in a fully automated manner.

It is neither necessary that an adapter for retrofitting ISO containers 5 to a gripping hook system has to be manually inserted, nor is it necessary that the load-handling vehicle 1 is precisely aligned with the ISO container 5, or that the ISO container 5 stands at the same inclination as the load-handling vehicle 1.

The disadvantages mentioned at the outset are therefore avoided, and corresponding advantages are achieved.

LIST OF REFERENCE SIGNS

1 Load-handling vehicle
2 Truck bed
3 Cab
4 Roll-on/roll-off container
5 Transportation container
6 Roll-on/roll-off flatbed
7 Hook
8 Loading arm assembly
9 Main arm
10 Piston/cylinder unit
11 Auxiliary arm
12 First telescopic arm part
13 Second telescopic arm part
14 Pivot arm part
15 Articulation
16 Gripping hook
17 Articulation
18 Clearance
19 Leg of the auxiliary arm, or of the second telescopic arm part, respectively
20 Crossbeam region/crossbeam
21 Crossbeam region/crossbeam
22 Arrow
23 Arrow
24 Corner gripper
25 Corner gripper
26 Piston/cylinder unit
27 Housing
28 Longitudinal axis of the pivot arm part
29 Piston/cylinder unit
30 Leg of the pivot arm part
31 Leg of the pivot arm part
P1 Arrow
P2 Arrow
P3 Arrow
P4 Arrow
P5 Arrow

The invention claimed is:

1. Loading arm assembly for a load-handling vehicle configured for unloading and loading of ISO containers and transportation containers having a hook, the loading arm assembly including:
   a main arm,
   an auxiliary arm connected with respect to the main arm,
   a pivot arm part connected with respect to the auxiliary arm so as to be pivotable by way of an articulation,
   a gripping hook connected with respect to a first end of the pivot arm part, the gripping hook configured for unloading and loading of transportation containers having a hook, and
   a crossbeam connected with respect to a second end of the pivot arm part, the crossbeam including at least two corner grippers configured for unloading and loading of ISO containers,
   wherein the pivot arm part in a transporting position engages in a clearance of the auxiliary arm.

2. Loading arm assembly according to claim 1, wherein the auxiliary arm has two legs, wherein the legs delimit the clearance, wherein the pivot arm part is disposed so as to be articulated on the legs.

3. Loading arm assembly according to claim 1, wherein the articulation is situated in a range of 40% to 60% of the longitudinal extent of the pivot arm part, between the first and second ends of the pivot arm part.

4. Loading arm assembly according to claim 1, wherein the gripping hook by means of a further articulation is disposed so as to be rotatable on the pivot arm part.

5. Loading arm assembly according to claim 1, wherein the pivot arm part has two legs, wherein the gripping hook is disposed so as to be articulated on said two legs.

6. Loading arm assembly according to claim 1, wherein the auxiliary arm is configured so as to be telescopic, wherein the auxiliary arm has a first telescopic arm part that is disposed at a fixed angle on the main arm, and has a second telescopic arm part, wherein the second telescopic arm part is capable of being telescopically moved relative to the first telescopic arm part, wherein the pivot arm part is disposed so as to be articulated on the second telescopic arm part.

7. Loading arm assembly according to claim 1, wherein the crossbeam is pivotable about a transverse axis, the transverse axis extends perpendicularly to a longitudinal axis of the crossbeam and perpendicularly to a longitudinal axis of the pivot arm part.

8. Loading arm assembly according to claim 7, wherein the crossbeam is pivotable about the longitudinal axis of the pivot arm part.

9. Loading arm assembly according to claim 1, wherein the crossbeam and the pivot arm part are connected by way of a universal joint.

* * * * *